United States Patent [19]

Koeller

[11] Patent Number: 4,554,431

[45] Date of Patent: Nov. 19, 1985

[54] WATER SHIELD RING FOR PLASMA ARC CUTTING TORCH

[75] Inventor: David L. Koeller, Dubuque, Iowa

[73] Assignee: Deere & Company, Moline, Ill.

[21] Appl. No.: 617,211

[22] Filed: Jun. 4, 1984

[51] Int. Cl.[4] .............................................. B23K 9/00
[52] U.S. Cl. ...................... 219/121 PP; 219/121 PC; 219/121 PM; 219/72
[58] Field of Search ................. 219/121 PM, 121 PN, 219/121 P, 121 PP, 121 PQ, 76.16, 74, 75, 72; 313/231.31, 231.41

[56] References Cited

U.S. PATENT DOCUMENTS 3,487,194  12/1969  Poulton et al. .................... 219/72 X
3,833,787  9/1974  Couch, Jr. ...................... 219/121 PP Primary Examiner—M. H. Paschall

[57] ABSTRACT

A plasma arc cutting apparatus includes an adjustment member adjustably supporting a cutting torch. A rod is mounted to the adjustment member at one end and to a water shield ring at the other end for supporting the water shield in radially spaced apart relationship around a portion of the cutting torch.

2 Claims, 3 Drawing Figures

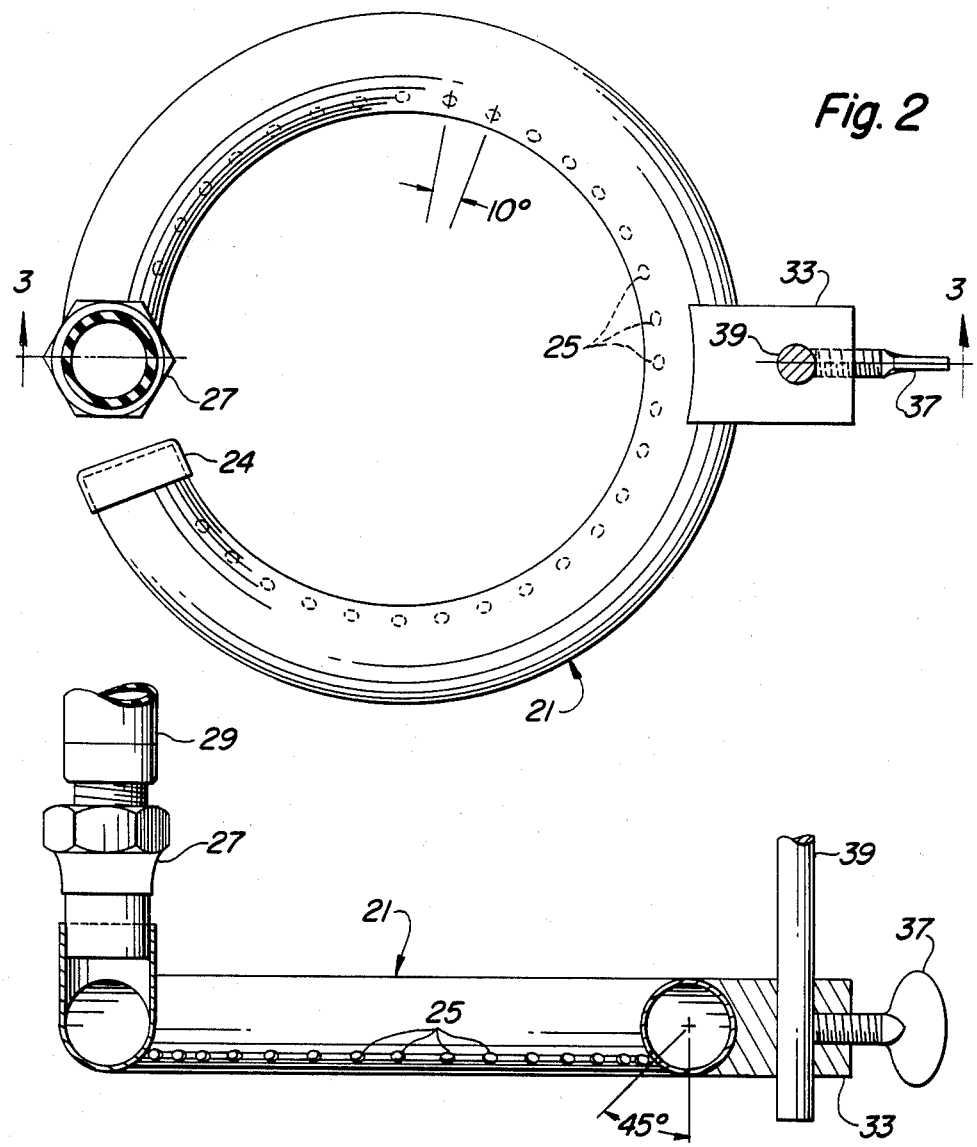

WATER SHIELD RING FOR PLASMA ARC CUTTING TORCH

BACKGROUND OF THE INVENTION

This invention relates to the water shield associated with a plasma arc cutting apparatus and, more specifically, to the water shield delivery ring mounting arrangement.

It is customary to mount a water shield ring directly to the cutting torch of a plasma arc cutting apparatus which is used to cut a steel plate workpiece. During the cutting process, cooling water is delivered through a hose to the shield ring and therefrom onto the workpiece in the immediate vicinity of the cutting area. The delivered water reduces smoke and noise generated during the cutting process, and further assists in the prevention of heat distortion of the workpiece.

The customary mounting arrangement of the water shield ring has been postulated to precipitate the premature buildup of carbon along the cutting torch of the plasma arc cutter. This buildup results in distortion of the associated electrode tip and associated components, and as a result thereof, an improper bevel cut. Further, carbon buildup facilitates shorting out of the height sensing system of the plasma arc cutter, resulting in an improper height setting of the torch during the cutting process. A still further problem results from repeated raising of the torch. When the cutting torch is raised to allow the substitution of workpieces, the weight of the associated hose on the shield ring causes the cutting torch to be subjected to a torsional load resulting in bending of the cutting torch. As a result of torch bending, the cut produced by the cutting torch is beveled. The cited problems result in substantial machine downtime and a significant amount of improperly cut workpieces.

SUMMARY OF THE INVENTION

It is an object of the present invention to present a means of mounting the shield ring isolated from of the cutting torch and thereby overcoming or substantially lessening the impact of and aforestated problems.

A plasma arc cutting apparatus includes a machine frame portion having a vertical adjustment member supporting a cutting torch. A shield ring is located around the lower portion of the cutting torch in spaced apart relationship thereto. The shield ring is independently supported by a rod fixably mounted to a vertical adjustment member. A hose is fixably mounted to the shield ring for conducting shielding water from a remote source to the shield ring. Water delivered to the shield ring is dispensed through a plurality of spaced apart apertures located on the underside of the shield ring to the workplate in the cutting area. The apertures are orientated to direct shielding water to impact the insulated surface of the cutting torch before descending to the workpiece to inhibit produced smoke from chimneying between the water shield ring and the cutting torch.

Additional advantages of the invention will be apparent from the subsequent description of the preferred embodiment.

BRIEF DESCRIPTION OF THE DRAWING

FIG. 2 is a plane view of the water shield ring.

FIG. 3 is a side view of the water shield ring.

DESCRIPTION OF THE PREFERRED EMBODIMENT

Figure 1:
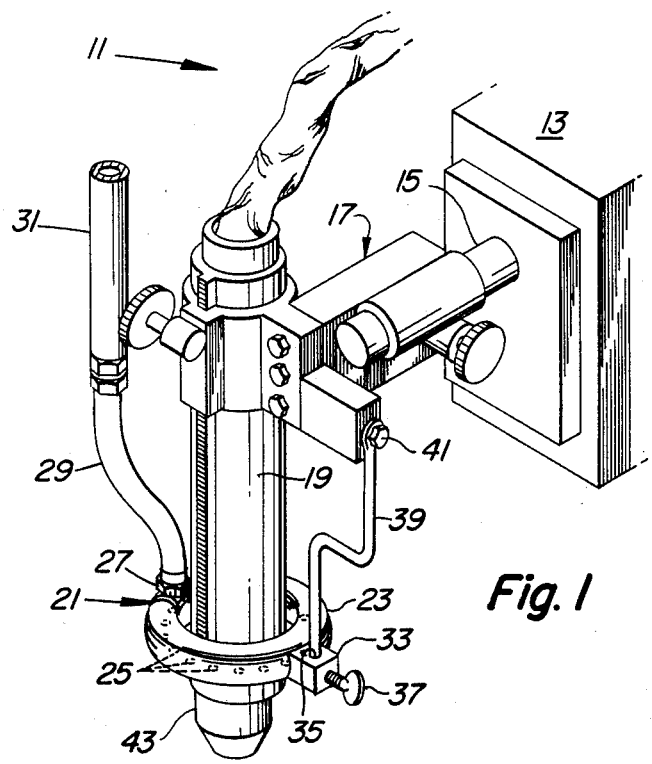
FIG. 1 shows a perspective view of a portion of a plasma arc cutter having a water shield ring in acordance with the present invention.

Referring now to FIG. 1, therein is shown a machine 11 used for fabricating plated steel parts. The machine 11 has a frame portion 13 which has a mounting cylinder 15 extending horizontally therefrom. A conventional support and vertical adjusting mechanism 17 is slidably and adjustably mounted horizontally on the support shaft 15 in a conventional manner. The cutting torch 19 is adjustably mounted vertically in the adjusting mechanism 17 in a conventional manner above a workpiece (not shown).

A water shield ring 21 is comprised of a ring shaped tube 23 sealed at one end and enclosed by end cap 24 at the other end. A plurality of apertures 25 are positioned circumferentially around in spaced apart relationship of approximately 10 degrees through the underside of tube 21. The ring 21 includes a coupler 27 secured thereto in close proximity to the sealed end of the ring 21. A conduit 29 is secured to the coupler 27 in a conventional manner. A hose 31 is secured to the other end of conduit 21 in a conventional manner to permit delivery of shielding water to the ring 21 for dispersal through apertures 25. The apertures are offset inwardly at an angle of approximately 25 degrees.

Fixably mounted to the tube 23 by any conventional means is a vertical locking portion 33 having a vertically directed aperture 35. A thumb key 37 is threadably and adjustably mounted in the locking portion 33 to traverse aperture 35. A support rod 39 is slidably received in aperture 35 of locking portion 33 to be adjustably secured therein by thumb key 37. The other end of rod 39 is fixably mounted to a portion of adjusting mechanism 17 by a nut 41 in a conventional manner such that tube 23 is supportably located around a portion of and in radially spaced apart relationship to the cutting torch 19.

In operating, the frame portion 13 is manipulated by the machine 11 in a conventional manner to trace a workpiece area desired to be cut by the cutting torch 19. The ring 21 resultingly manipulated in like manner to torch 19. The aperture 25 in the ring 21 directs shield water to impact the insulated cutting torch portion 43 in a vortex formation. By so directing the shielding water, smoke and noise generated during the cutting process is not permitted to chimney between the cutting torch 19 and ring 21. The spacial relationship between the torch 19 and the spray ring 21 is such that deformation of the ring 21 during raising of frame portion 13 is not transmitted to the cutting torch 11. Therefore, the quality to the torch cut is preserved.

I claim:

1. In combination with a plasma arc cutting machine having a mounting cylinder, a torch support member mounted to said mounting cylinder, a cutting torch having a lower tip portion, said torch being mounted to said torch support member, and a water shield ring; wherein the improvement comprises:

a rod fixably mounted at one end to said torch support member;

said water shield ring being fixably mounted to said rod at said rod's other end to maintain said water shield ring in close spaced apart radial relationship to said torch and in close vertical relationship with said lower tip portions of said torch.

2. A combination as claimed in claim 1 wherein said water shield ring comprises:

a tubular ring singularly discontinuous, said tubular ring having a plurality of apertures in radially spaced apart relationship therearound the underside of said tubular ring and directed inwardly towards said lower tip portion of said torch;

an end cap fixably mounted to one end of said tubular ring;

an elbow coupler fixably mounted to the other end of said tubular ring; and means for delivering shielding water to said elbow coupler.

* * * * *